(No Model.) 6 Sheets—Sheet 1.

A. JOHNSON & H. C. BLACK.
CAN MAKING MACHINE.

No. 526,925. Patented Oct. 2, 1894.

Fig. 1.

Witnesses.
Inventors:

(No Model.) 6 Sheets—Sheet 2.

A. JOHNSON & H. C. BLACK.
CAN MAKING MACHINE.

No. 526,925. Patented Oct. 2, 1894.

Witnesses.

Inventors:
H. C. Black
A. Johnson
by N. A. Acker
Atty.

(No Model.) 6 Sheets—Sheet 3.

A. JOHNSON & H. C. BLACK.
CAN MAKING MACHINE.

No. 526,925. Patented Oct. 2, 1894.

Fig. 4.

Witnesses.
Inventors:
H. C. Black
and
A. Johnson

(No Model.) 6 Sheets—Sheet 6.

A. JOHNSON & H. C. BLACK.
CAN MAKING MACHINE.

No. 526,925. Patented Oct. 2, 1894.

Witnesses.

Inventors:
H. C. Black
and
A. Johnson
by N.A. Acker
atty.

UNITED STATES PATENT OFFICE.

AXEL JOHNSON AND HENRY CLAY BLACK, OF OAKLAND, CALIFORNIA.

CAN-MAKING MACHINE.

SPECIFICATION forming part of Letters Patent No. 526,925, dated October 2, 1894.

Application filed January 5, 1894. Serial No. 495,766. (No model.)

*To all whom it may concern:*

Be it known that we, AXEL JOHNSON and HENRY CLAY BLACK, citizens of the United States, residing at Oakland, in the county of Alameda and State of California, have invented certain new and useful Improvements in Can-Making Machines; and we do hereby declare the following to be a full, clear, and exact description of said invention, such as will enable others skilled in the art to which it most nearly appertains to make, use, and practice the same.

This invention relates to a new and useful can making machine, which consists in the arrangement of parts and details of construction as will be hereinafter more fully set forth in the drawings, and described and pointed out in the specification.

Under the present system of can making two distinct operations or steps are required to complete the can, the first being the formation of the can body upon a horn, mandrel or similar device; and the second applying the heads to the formed or completed can body. It is usual to provide independent machines to accomplish these steps, that is—a seaming machine and a heading machine,—although machines have been devised whereby both operations may be successfully carried out in one machine. However two operations are now required to form and head the can whether two machines or only one machine be employed for the purpose.

The object of our invention is to provide a machine which will form the can body and secure the heads or ends thereto in one operation, thus dispensing with the necessity of the ordinary seamer machine, and at the same time provide a machine which will be no more expensive in its construction and operation than the ordinary automatic heading machine, thus producing in one machine a combined forming and heading machine.

In order to more fully understand the invention, reference must be had to the accompanying sheets of drawings, which form a part of this application, wherein—

The letter A is used to indicate the frame of the machine, within which the carrier wheel works, said wheel being composed of two disks A', A², which disks are loosely mounted upon stationary shaft B. This shaft runs cross-wise of the frame. Consequently the carrier wheel revolves in a plane parallel with the side pieces thereof. The disks which compose the carrier wheel are located a distance apart equal to the width of the clamping jaws, so as to enable the latter to be held therebetween, which work between the inner shoulders $a$, of the disks. These disks are cast with the hubs $a'$, which separate the two and hold them apart.

The clamping jaws are composed of two sections $B'$, $B^2$, hinged together by the rod $b'$, which passes through the knuckle $b$, of each section. Upon this rod the sections swing in order to open or close the clamping jaw. This rod passes through the disks forming the carrier wheel and tends to hold the disks rigid.

In the present instance we have shown the carrier wheel as being provided with five clamping jaws, but this is immaterial as any suitable number may be employed. These jaw sections are connected by means of the straps or plates C, C', one end of each being fastened to its respective jaw section by pin $c$, as shown, while the other or free end is loosely secured upon short axle or shaft $C^2$, the outer end of which shaft is provided with a roll $c'$. This shaft projects through the vertical opening or slot $c^2$, cut in disk $A'$. Consequently the roll $c'$, is beyond the outer face of said disks.

By means of the hereinafter described mechanism the shaft $C^2$, is raised and lowered within the vertical slot in order to close and open the clamping jaw, the sections of which are brought together or forced apart by the inward or outward movement of the connecting straps C, C', owing as to whether the shaft $C^2$, is raised or lowered.

Figure 1:
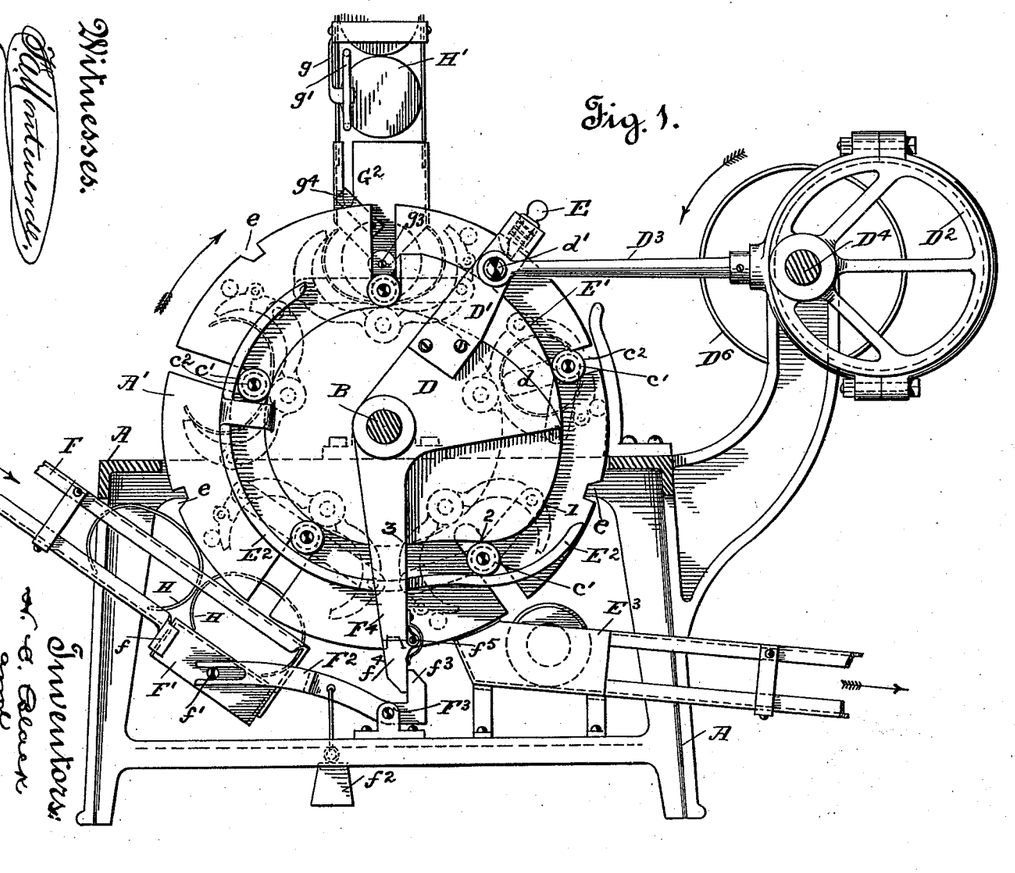
Figure 1, is a front elevation of the machine, showing one of the disks composing the carrier wheel, clamping jaws, cam for closing the jaws and imparting motion to the carrier wheel, eccentric for operating the cam, chute for supplying can body blanks to the clamping jaws, and can head feed chutes, said parts being shown in position immediately after the discharging of a can from the machine and just prior to closing one of the clamping jaws in order to fold the body blank around the can heads, one of said heads being shown held in place upon the can body blank by the movable can head guide.
Figure 2:
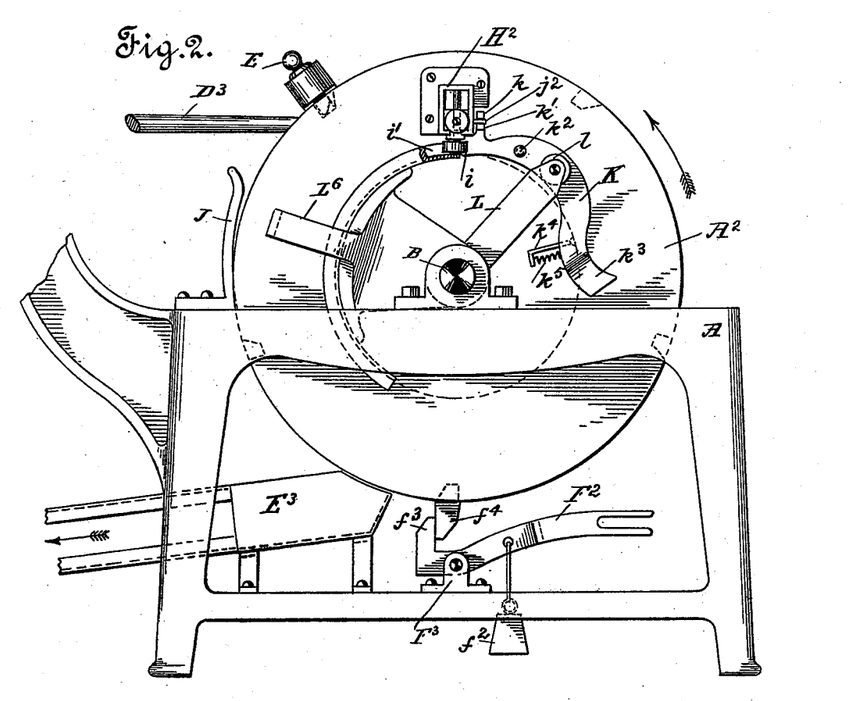
Fig. 2, is a rear elevation of Fig. 1, with the can head feed chutes removed.
Figure 3:
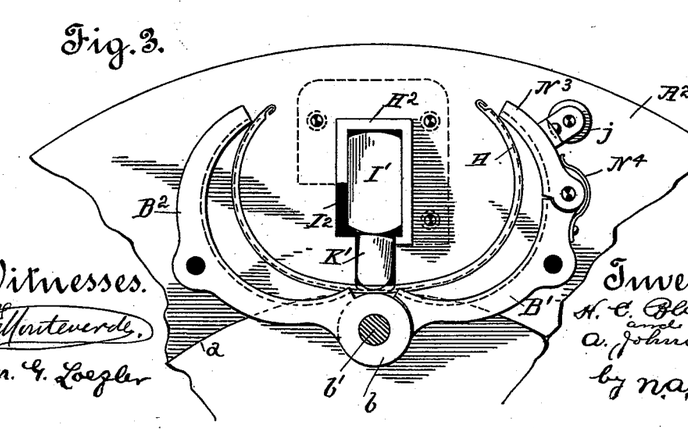
Fig. 3, is an enlarged detail front elevation of the jaw when open, showing the body blank therein, the end of the mandrel for closing the side seam of the can body, and of the rod for raising the mandrel, after it has moved within the can body, in order to cause the same to bear tightly upon the side seam and insure the closing thereof.
Figure 4:
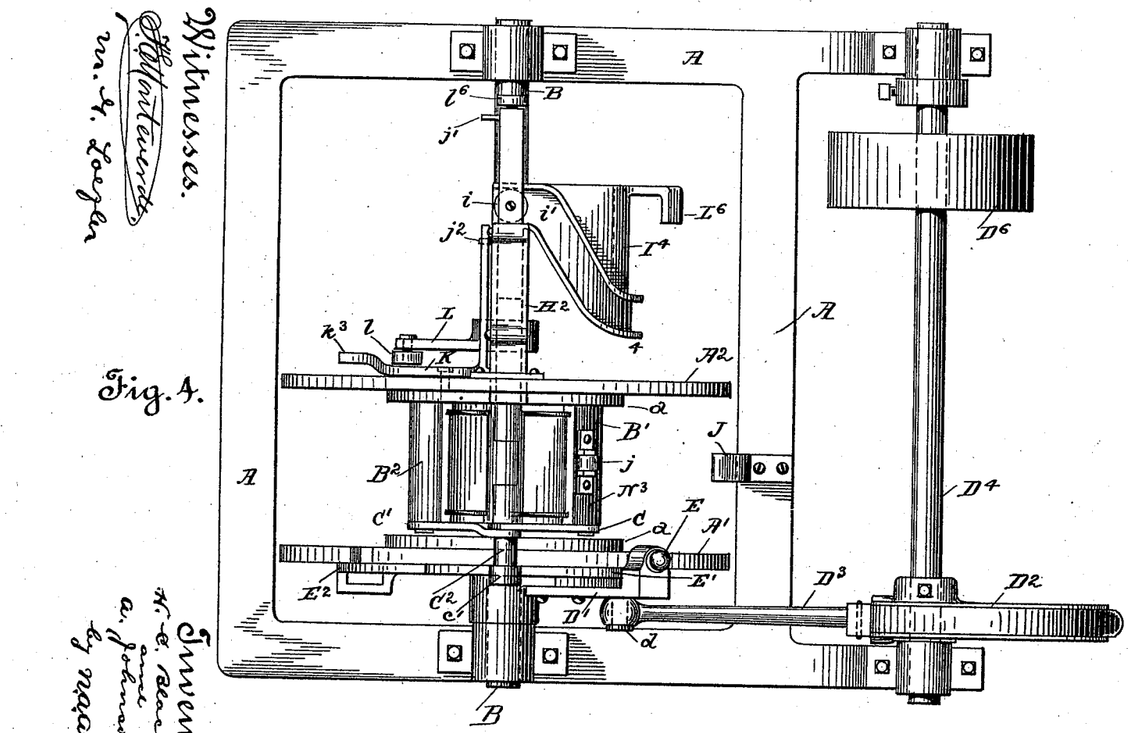
Fig. 4, is a top plan of Fig. 1, with can head feed chute removed, showing the upper clamping jaw open and body blank and heads removed therefrom.

In front of the disk $A'$, is secured the sector cam D, which is also loosely mounted upon the shaft B. The face of this cam is cut eccentrically, as shown at $d$. Hence we shall hereinafter refer to the same as an eccentric sector cam. From this cam projects the arm D', which is connected to the eccentric $D^2$, by pitman $D^3$, the forward end of said pitman being fastened to the arm by wrist pin $d'$. The eccentric $D^2$, is rigidly affixed to the drive shaft $D^4$, said shaft being supported by bracket projecting from the frame A. See Figs. 1 and 4. This shaft is operated by belt wheel $D^6$, secured thereon, which is rotated by a pulley belt. Not shown. The top of arm D', is bent at a right angle, and through the bent portion thereof works the spring actuated catch E, the lower end of which fits within one of the notches $e$, cut in the periphery of disk $A'$.

It will be noticed that the end of spring actuated catch is cut upon an incline, while the forward portion of the notches $e$, is likewise cut away. This is for the purpose of permitting the catch to move from engagement with the notched portion of the carrier wheel upon the forward stroke of the sector cam. As the eccentric is thrown forward the sector cam is likewise moved, through its connection therewith, until its full stroke is made, when the spring catch will engage with the next notch cut in the disk $A'$, of the carrier wheel.

Upon the rear throw of the eccentric the sector cam is not only carried thereby, but the carrier wheel likewise, owing to the catch being in locked engagement therewith. Thus it will be noticed that the movement of the carrier wheel is intermittent and not continuous. As the outer cam is thrown forward the lower portion of the inclined face thereof is brought beneath the face of roll $c'$, and as the face of this cam is eccentrically cut it is obvious that as the cam continues its forward movement the roll travels upon the inclined face and gradually raises the shaft $C^2$, until the roll is placed in line with the top of the eccentric cam E', which is secured in front of the disk $A'$, upon shaft B. This upward lift of shaft $C^2$, brings the straps C, C', toward each other and causes the jaw sections to close. As the carrier wheel is advanced one step, by the rear throw of the eccentric, the roll C', rides upon the eccentric cam E'. It will be noticed that the roll bears upon this cam and the jaw remains closed until the point 1, is reached, when the same rides upon the fixed trackway or rib $E^2$, which runs from this point to point 2, of the disk $A'$. The trackway $E^2$, runs downwardly, cam E', inwardly until the point 3, is reached, when each run in the true arc of a circle thereafter. When the roll begins to ride upon the track $E^2$, the axle $C^2$, is forced downward within the vertical openings $c^2$, which forces the connecting straps of the jaw sections apart and opens the clamping jaw for the discharge of the can into the chute $E^3$. From the point 3, the track $E^2$, forms a guard for preventing the closing of the clamping jaw until the same has been carried beyond the upper end thereof.

The feed chute which conveys the body blank to the machine is represented by the letter F. This chute is arranged at an angle of about forty-five degrees and the lower end thereof terminates in a movable platform F', which works in guides $f$. From the sides of this platform projects the pin $f'$, which is embraced by the forward arms of the bifurcated lever $F^2$. This lever is fulcrumed between the arms of brackets $F^3$, and by means of the suspended weight $f^2$, the forward end thereof is held downward. When the carrier wheel has been rotated so as to bring an empty jaw immediately above the end of the feed chute, the same will be open its full distance. The sector cam will then be in such position as to make a forward throw in order to rotate the carrier wheel one step and as the same is thrown forward to engage with the carrier wheel, the downwardly extending arm $F^4$, of the sector cam is thrown to the rear and lower end thereof engages with the upwardly projecting shoulder $f^3$, of the fulcrumed lever and necessarily forces the same downward, which throws the forward end upward and thus raises the movable platform of the feed chute and places a body blank within the open clamping jaw. In view of the fact that it is necessary for the can body blank to be placed in its seat and the platform lowered so as to be free of the jaw before the carrier wheel has motion imparted thereto, we shorten the lift of the fulcrumed lever. Consequently the end of the arm $F^4$ will free itself from engagement with shoulder $f^3$, and pass therebeyond. The movable arm moves from engagement with the shoulder $f^3$ and the weighted fulcrumed lever descends, carrying the movable platform of the feed chute therewith. So as to enable the end $f^4$, of arm $F^4$, to clear shoulder $f^3$, as the arm is moved forward, we connect this portion to the arm proper by a spring actuated hinge $f^5$. Owing to the peculiar shape given to the body blank as hereinafter more fully set forth, the same will remain within the open jaw by the spring of the metal itself.

At the top of the carrier wheel we locate the can head feed chutes G, G', being of the usual construction, through which the heads or ends drop or fall by gravity. From these chutes, near the lower end, project the brackets $g$, to which we fulcrum the spring actuated dogs $g'$, the teeth $g^2$ of which project through openings cut in the wall of the chutes. These teeth are such a distance apart as to hold one head therebetween. Therefore when the lower teeth are withdrawn to permit the falling of the heads, the upper ones enter the chutes and prevent the dropping of heads until the lower teeth re-enter the runway of the chutes. Thus only a pair of heads can drop at the same time. To the lower end of the chutes there is located a vertically movable guide $G^2$. This guide receives the heads from the runway of the chutes and deposits the same upon the body blank held within the open jaw and holds the same in place while the jaw in closing forms the body therearound. The end of this guide is wedge shaped and consequently as it descends the body blank is forced open its full distance. This guide does not suddenly rise from within the jaw, for if so the heads would likely be displaced by the jar, but is gradually removed as the jaw closes. The roll $g^3$ secured to the lower end of the guide bears upon the joint of the straps C, C', and as the straps are brought together, in order to close the clamping jaw, by the vertical movement of the shaft $C^2$, the guide is gradually lifted from within the jaw. This guide is formed with openings which register with the can head openings of the chutes. Consequently the same may be said to form a continuation thereof. From the guide projects the deflecting plate $g^4$. This plate, as the guide moves upward, forces the lower tooth of the fulcrumed dog within the feed chute and withdraws the upper one and thereby releases the can heads held by the upper tooth.

In order to provide against the feed chute dropping between the carrier wheel when removed from within the jaw, which it would do when the carrier wheel is being rotated one step in order to place another jaw beneath the can head feed chute, we secure to the inner face of disk A', the flange $G^4$, upon which flange the roll $g^3$, bears when the guide is raised from within the jaw. This flange supports the can head guide and holds same in position until the next open jaw is brought around into position to receive the can head.

Figures 5, 6, 7:
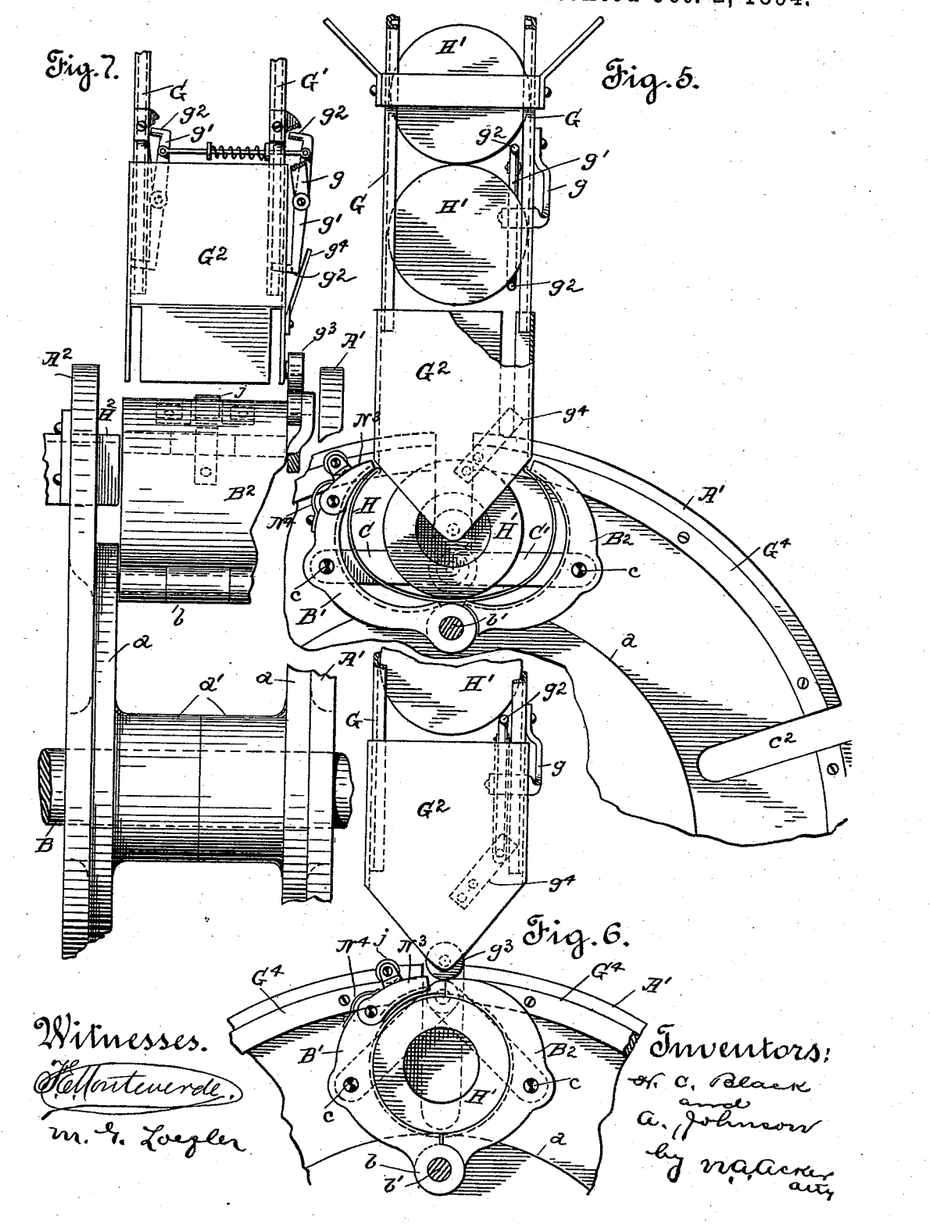
Fig. 5, is an enlarged detail rear elevation of the clamping jaw and can head feed chute, showing the body blank held within the jaw and position of heads after being discharged from the feed chutes.
Fig. 6, a view similar to Fig. 5, showing position of feed chute guide after the clamping jaw is closed.
Fig. 7, is an end elevation of Fig. 6.

In Fig. 5, we have shown the clamping jaw with the can body blank H, held therein, the can head H', in position to permit the can body blank to be formed therearound and the guide for the can head holding the head in place in order to prevent its tilting to one side, while in Fig. 6, the clamping jaw is shown as closed, the body being folded into proper shape around the can heads, and the can head guide raised from within the clamping jaw and in line with the supporting flange $G^4$.

To the rear face of the disk $A^2$, is bolted or otherwise secured the mandrel frame or casing $H^2$, within the side $h$, of which is cut the bayonet slot $h'$, and in the bottom plate is fitted and works the cross head $H^3$. Upon the cross-head rests the mandrel rod I, which terminates at its inner end into an enlarged head or mandrel I'. This mandrel is of such size as will readily enter the can body, formed by the clamping jaw, through the filling orifice formed in one of the heads. This mandrel passes through an opening $I^2$, cut through the disk $A^2$, for this purpose. The mandrel is moved in or out of the can body through the medium of the cross-head $H^3$, which is united to the mandrel rod I, by the pin $I^3$, which extends through an opening formed in said rod, which pin while serving to force the mandrel rod in or out in accordance with the movement of the cross-head $H^3$, does not prevent said rod from having a vertical movement independent of the cross-head. When the mandrel is withdrawn from the can body it fits within the casing or frame and completely fills the same, and when in this position no vertical movement can be given the mandrel, but when the mandrel first enters the can body it is a considerable distance from the seam thereof and it then becomes necessary to impart a vertical movement to the mandrel rod in order that the mandrel may be raised so as to bear upon and close the side seam of the can body. This is accomplished by mechanism which will be set forth later on in the specification.

Figures 8, 9, 10:
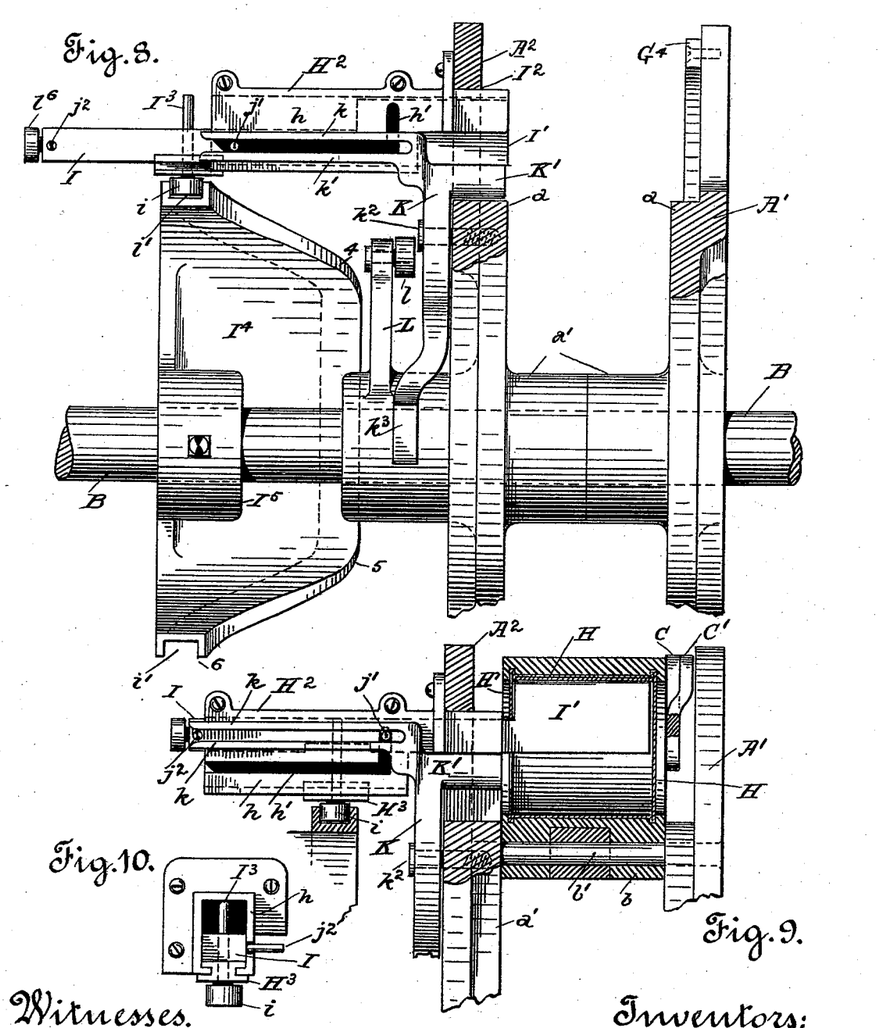
Fig. 8, is a front end elevation of Fig. 4, showing the mandrel in its outward position and clamping jaw removed from between the carrier disks, the disks being partly in section.
Fig. 9, is a similar view with the clamping jaw between the disks, the same being closed around the can body and heads, the mandrel shown inside the can body and raised.
Fig. 10, is a detail end elevation of the mandrel and casing.
Figure 11:
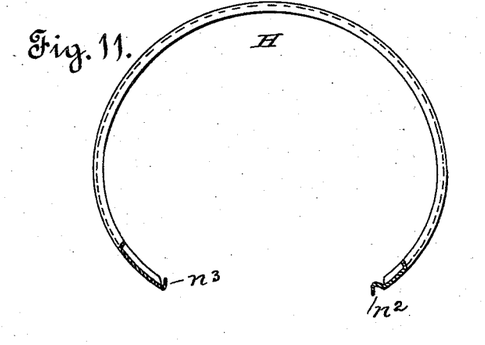
Fig. 11, is an end view of the can body blank.
Figure 12:
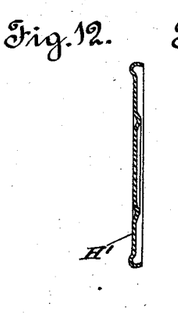
Fig. 12, is a cross section of the can head.
Figure 13:
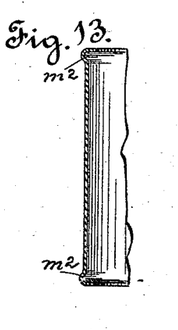
Fig. 13, is a longitudinal section of a portion of the can body.

The lower end of the cross-head pin $I^3$ has a roll $i$, secured thereto, which roll works within the groove or runway $i'$, formed within the circular plate $I^4$. This plate we have shown in the drawings as extending only half way around the shaft A, see Fig. 8, but in practice we shall make it in the form of a circular plate so as to keep the roll $i$, continually within the groove $i'$. It will be observed that this groove runs inward at an incline for a given distance, say to 4, thence in a line parallel with the disk $A^2$, to point 5, and from thence to point 6, at an outward incline. Hence as the roll $i'$, travels within the groove toward point 4, the cross-head is moved inward, carrying therewith the mandrel rod, the movement of which rod forces the mandrel within the can body. As the roll works within the straight portion of the groove the mandrel is raised or lifted so as to bear tightly against the under face of the side seam of the can body in order to close the seam. During this portion of the travel of the carrier wheel, the roll $j$, secured to one of the jaw sections, bears firmly against the guard plate J, and causes the clamping jaw to press firmly upon the mandrel, thus preventing the jaw from being forced open by the outward pressure of the mandrel. After the carrier wheel has traveled the length of the guard plate, the roll $i'$, will have traveled from 4 to 5, when it enters the outwardly inclined portion of the groove and gradually withdraws the mandrel until point 6, is reached, after which it travels in a true circle until point of entrance to the inwardly inclined portion of the groove is reached. We provide a mandrel for each jaw, although in the drawings only one is shown, but only one grooved plate is provided, the roll of each cross-head traveling therein. Of course each mandrel is carried around with the movement of the carrier wheel, being affixed to the disk $A^2$. The plate $I^4$, is a non-rotating one, the hub $I^5$, thereof being rigidly affixed to the shaft B. From the mandrel rod project two pins or studs, $j'$, $j^2$, the former of which works within the bayonet slot $h'$. These pins or studs are embraced by the arms $k$, $k'$, which project outward from the lift rod K. This rod is fulcrumed to the disk $A^2$, by pin $k^2$, and the upper end $K'$, thereof is cast at an angle so as to fit within the opening $I^2$, and upon the same rests the mandrel. The lower end portion of the lift rod is bent outwardly, as shown at $k^3$. From this portion of the lift rod extends the small bracket rod $k^4$, which is connected to the disk $A^2$, by spring $k^5$. This spring exerts a constant upward pressure upon the lower portion of the rod, which maintains the upper end downward. The lower portion of the lift rod is bent outwardly so as to be in line with the roll $l$, projecting from fixed arm L. This arm, like plate I, is a fixed or non-rotating one, being rigidly secured to the shaft B, as shown.

For each jaw or mandrel there is a lift rod and these rotate with the carrier wheel. The mandrel is raised after being inserted within the can body, by the roll $l$, of arm L, bearing upon the outwardly bent or curved portion $k^3$, of the lift rod, which forces the lower portion of said rod downward so as to raise the upper end in order to lift the mandrel. After the roll $l$, has moved from off the portion $k^3$, of the lift rod, the same is raised by the action of the spring $k^5$, which causes the upper end to move downward, thus lowering the mandrel. By this time, however, the clamping jaw will have traveled the full distance of the guard plate and the mandrel be on its outward movement. As the lift rod is raised the arms $k$, $k'$, are moved therewith and carry the mandrel rod likewise. These arms impart an even lift to the mandrel rod and mandrel.

From the plate $I^4$, projects the flanged bracket $L^6$, under the flange of which the roll $l^6$, secured to the end of the mandrel-rod, travels when the mandrel is held raised within the can body. This is for the purpose of supporting the mandrel rod and holding same in line with the mandrel, so as to prevent the tilting or wabbling of the same, which, if permitted, would cause the formation of a loose and an improper seam to the can.

The can body blank H, before entering the feed chute, is passed between the crimper rolls M, M', the roll M being provided with the circular flange or beads $m$, near the ends thereof, while the roll M' has the circular grooves $m'$, cut therein, into which the projecting flange $m$, fits. Consequently as the sheet of metal is fed through the rolls, grooves $m^2$, are formed along the sides thereof, which gives an outwardly projecting bead to the sheet. By means of the guide roll $M^2$, the blank sheet of metal curves upwardly as it comes from the crimper rolls. Roll M, has a longitudinal groove $n$, cut therein, into which fits the longitudinal tooth $n'$, of roll M'. As the end of the body blank enters the rolls, tooth $n'$ forces the metal into longitudinal groove $n$, and thus forms an outwardly flared hook $n^2$.

Figures 14, 15, 16:
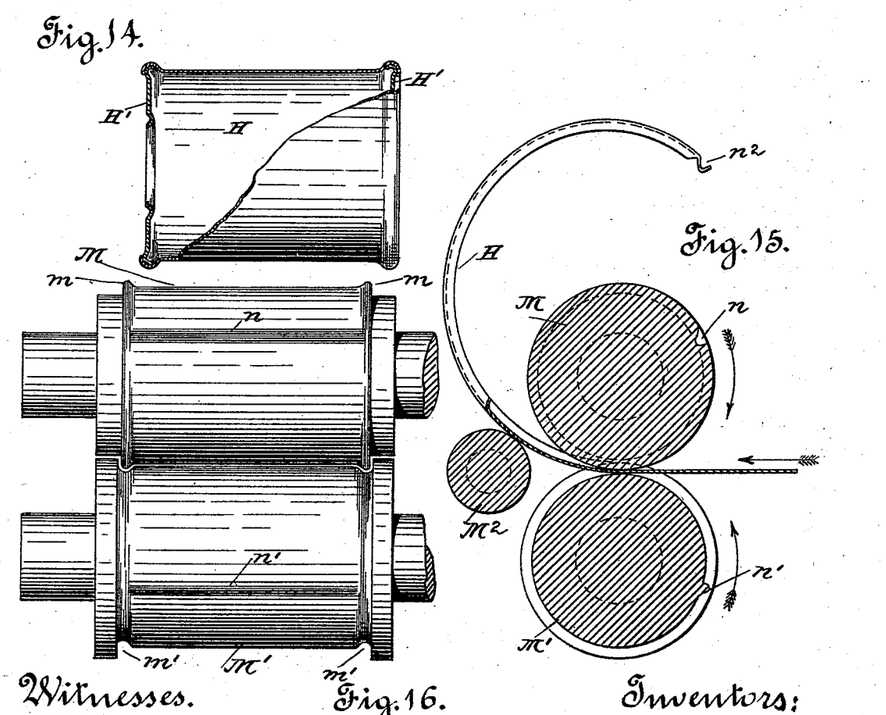
Fig. 14, a front view of the finished can, partly in section.
Fig. 15, a vertical sectional view of the crimper rolls, showing a can body blank passing therethrough.
Fig. 16, is a front elevation of the crimping rolls.

The crimper rolls are of such diameter that with one revolution thereof the body blank is passed therethrough. As the body blank is about to leave the rolls the opposite end thereof is engaged by the tooth $n'$, and forced into groove $n$, whereby an inwardly projecting hook $n^3$, is formed which interlocks with hooked end $n^2$, when the blank is rounded up within the jaw. By thus stamping the body blank we provide for the formation of what is known as a "lock joint." Within the grooves $m^2$, the heads H', are securely held when the body is formed. The side grooves $m^2$, of the body blank, form annular groves when the body is rounded and closed, which constitute the seat for the can heads and serve to hold the heads firmly in place. When the can is formed the body is rolled around the heads, which rest within the annular grooves. See Fig. 14. This manner of securing the heads provides an exceedingly strong can. The grooves $m^2$, are made of a width equal to the flange of the heads. By the sliding guide, which works upon the lower end of the can head feed chutes, the heads are accurately placed within these grooves and held therein while the body is being formed therearound.

The crimper and guide rolls are connected together by suitable gear mechanism, and may, if so desired, be driven by means of a drive belt or sprocket chain, from the drive shaft of the machine proper. The can body blank as delivered from the crimper rolls, enters the body blank feed chute and is conveyed to the machine.

Owing to the fact that we provide a lock joint for the can body, it is necessary that a slight motion be allowed to our clamping jaw, after being closed, so as to bear firmly upon the hooked ends, which constitute the side seam, in order to tightly close the joint. This we accomplish by forming the jaw section B', with the hinged portion $N^3$, which is held in place by the spring $N^4$. To this hinged portion is secured the bearing roll $j$. As the clamping jaw travels beneath the guard plate J, the roll $j$, contacts therewith and forces the hinged portion $N^3$, of the clamping jaw down upon the lock seam, directly under which the mandrel is held and thereby tightly closes the same.

After the can has been formed in our machine it is conveyed to any suitable machine for soldering.

While we have described the present machine for the making of round cans, it is obvious that by simply changing the form of the clamping jaw a square can may be manufactured. Therefore we do not confine ourselves to the exact arrangement of parts set forth, but wish to be understood as claiming broadly any style of machine which automatically assembles can body blanks and heads and secures the head to the can by rolling the can body therearound, whether it be a square or round can.

We are aware that minor changes may be made in the arrangement of parts and details of construction herein shown and described without creating a departure from the nature and scope of our invention.

While we have described our machine for closing a lock joint side seam, a lap joint may be equally as well provided, but in such a case it would be necessary to connect with the machine a solder feed and solder iron in order to unite the lap joint.

Having thus described our invention, what we claim as new, and desire to secure protection in by Letters Patent of the United States, is—

1. In a can making machine, the combination with the carrier wheel provided with clamping jaws, of mechanism for placing body blanks within the jaws and heads upon the blanks, and of devices for closing the jaws in order to fold the blanks around the can heads and closing the side seam of the can body.

2. A can making machine provided with devices for receiving can body blanks and can heads, and with mechanism for forming the can body around the heads, closing the side seam of the can and discharging the can from the machine.

3. In a machine for making cans having tight fitting inside heads, the combination with a device for receiving the can body blank, and can heads, and folding the can body blank around the heads and holding the same therearound until the side seam is secured, with mechanism for closing the side seam of the can, thereby securing the can body outside of the heads.

4. In a machine for making cans having tight fitting inside heads, the combination with a chute or devices for delivering the can body blanks to the machine, a movable device for receiving the can body blanks, a chute or device for placing the head within the can body blank, mechanism for closing the movable device in order to fold the can body blank around the can heads and holding the same therearound until the side seam is closed, and mechanism for closing the side seam, thereby securing the can body outside the can heads.

5. In a can making machine, the combination with the rotatable carrier wheel, the clamping jaws secured to and carried by the carrier wheel, said jaws adapted to receive the can body blanks and fold the same around the heads, a feed chute for supplying blanks to the clamping jaw and a device for conveying the blanks from the chute to the clamping jaws.

6. In a can making machine for automatically assembling can body blanks and can heads and folding the blank around the heads, whereby a can with tight inside fitting heads is produced, the combination with the movable clamping jaw for receiving the blanks and heads, devices for feeding the blanks and heads to the jaw, mechanism for closing the clamping jaw in order to fold the body blank around the heads and so holding the same until the side seam of the can is closed, and of devices for closing the side seam of the can body while held around the heads.

7. In a can making machine, the combination with the carrier wheel, of the movable clamping jaw, devices for opening and closing the clamping jaw, the mandrel for closing the seam of the can formed by the clamping jaw, mechanism for forcing the mandrel in or out of the jaw, lift rod for raising the mandrel so as to bear against the under face of the seam of the can, and of a device for forcing the jaw tightly upon the seam of the can.

8. In a can making machine, the combination with the clamping jaw, for receiving can body blanks and heads mechanism for closing the clamping jaw in order to fold the body blank around the can heads, a device for maintaining the jaw closed until the side seam of the can is closed, a mandrel for entering the can body in order to close the seam, mechanism for forcing the mandrel within the can body and raising the same so as to bear against the under face of the side seam, device for forcing the clamping jaw firmly upon the side seam, and of mechanism for lowering the mandrel and withdrawing the same from within the can after the side seam is closed.

9. In a can making machine, the combination with the clamping jaw, of the mandrel adapted to enter the can body formed by the clamping jaw, of mechanism for imparting a longitudinal movement to the mandrel, and of a device for forcing the clamping jaw tightly against the side seam of the can body held within the jaw in order to close the same.

10. The combination with the clamping jaw of a can making machine, of a mandrel adapted to enter within the can body formed by the machine, and of mechanism for imparting longitudinal and vertical movement to the mandrel, whereby the mandrel is forced into the can, raised to bear firmly against the under face of the side seam, lowered after the seam is closed and then removed from within the can.

11. In a machine for forming cans by folding the body around the heads, the combination with the clamping jaws, of mechanism for opening and closing the jaws, of the mandrel for bearing against the under face of the side seam of the can, mechanism for imparting a reciprocating and vertical movement to the mandrel, and of a device for forcing the clamping jaw tightly against the upper face of the side seam, and causing it to close by pressure upon the mandrel.

12. In a can making machine, the combination with the carrier wheel, the clamping jaw composed of two sections swinging upon the same shaft, and of mechanism for imparting an intermittent motion to the carrier wheel, said mechanism comprising therewith a sector cam which upon its forward thrust serves to close the clamping jaw and upon its rear movement carries the carrier wheel therewith.

13. In a can making machine, the combination with the carrier wheel, of the mandrel, mandrel rod, mechanism for moving the rod in or out in order to cause the mandrel to enter the can held within the carrier wheel or to be withdrawn therefrom, and of a device for raising and lowering the mandrel.

14. In a can making machine, the combination with movable devices for receiving can body blanks within the same, of mechanism for causing the closure of the movable devices in order to fold the can body around the can heads, and of a mandrel for bearing against the under face of the side seam of the can body, said mandrel having a longitudinal and vertical movement.

15. In a can making machine, the combination with the carrier wheel, of a movable clamping jaw for receiving body blanks and heads, mechanism for closing the clamping jaw whereby the body blank is folded around the can heads, and devices for closing the side seam of the can.

16. In a can making machine, the combination of devices for receiving can body blanks and heads, folding the body blanks around the heads, closing the side seam thereof and discharging the completed can from the machine.

17. In a can making machine, the combination with the movable clamping jaw composed of two sections, one of said sections having the upper portion thereof secured thereto by a spring hinge, mechanism for feeding can body blanks and can heads to the clamping jaw when the sections are opened, the heads being placed inside the body blanks, devices for closing the clamping jaw in order to fold the body blank around the can heads, and device for closing the side seam of the can, whereby the heads are tightly secured inside the can body.

18. In a can making machine, the combination with the can head feed chutes, movable can head guide secured upon the lower ends of the chutes, said guide having a vertical movement, devices for raising said guide as the clamping jaw of the machine is closed, and of a device for maintaining the guide in its raised position until the next clamping jaw comes thereunder.

19. In a can making machine, the combination with the can head feed chute, the can head guide movably secured to the lower end thereof, and mechanism for feeding can heads to the guide as the guide is raised and lowered.

20. In a can making machine, the combination with the can head feed chute, the spring actuated dog secured thereto for regulating the feed of the can heads, and a movable guide, secured to the lower end of the can head feed chute, for receiving the can heads from the can head feed chute and conveying same to the clamping jaws of the can machine.

21. In a can making machine, the combination with the rotatable carrier wheel the clamping jaws secured thereto of the can head feed chute, a movable guide device secured to the lower end of the can head feed chute for receiving the heads from the chute and placing same within the jaw and holding same in place therein until the jaw is closed and devices for closing the jaw and raising the guide from the same.

22. In a can making machine, the combination with the carrier wheel, said wheel composed of two disks one of which is provided with a series of notches around the periphery thereof, clamping jaws held between the disks, a cam carrying a spring actuated catch for engaging the notched disk of the carrier wheel, mechanism for reciprocating the cam in order to impart an intermittent motion to the carrier wheel, and of devices for closing and opening the clamping jaws during the rotation of the carrier wheel in order to form the can and discharge the same from the machine.

23. In a can making machine, the combination with the carrier wheel, said wheel composed of two disks, one of which has a series of vertical slots cut therein, clamping jaws secured between the disks, said jaws composed of hinged sections, straps connecting the sections of the jaws, axle to which the free ends of the straps are secured, said axle extending through the vertical slots in one of the disks of the carrier wheel, a roll secured to the outer end thereof, a reciprocating cam for raising said roll in order to close the clamping jaw, and of mechanism for operating said cam.

24. In a can making machine, the combination with the carrier wheel, a mandrel, mandrel casing secured to the carrier wheel, mandrel rod, mechanism for forcing the mandrel rod in or out of the can, and devices for raising and lowering the mandrel.

In testimony whereof we affix our signatures in presence of two witnesses.

AXEL JOHNSON.
HENRY CLAY BLACK.

Witnesses:
LEE D. CRAIG,
N. A. ACKER.